United States Patent Office 2,944,858
Patented July 12, 1960

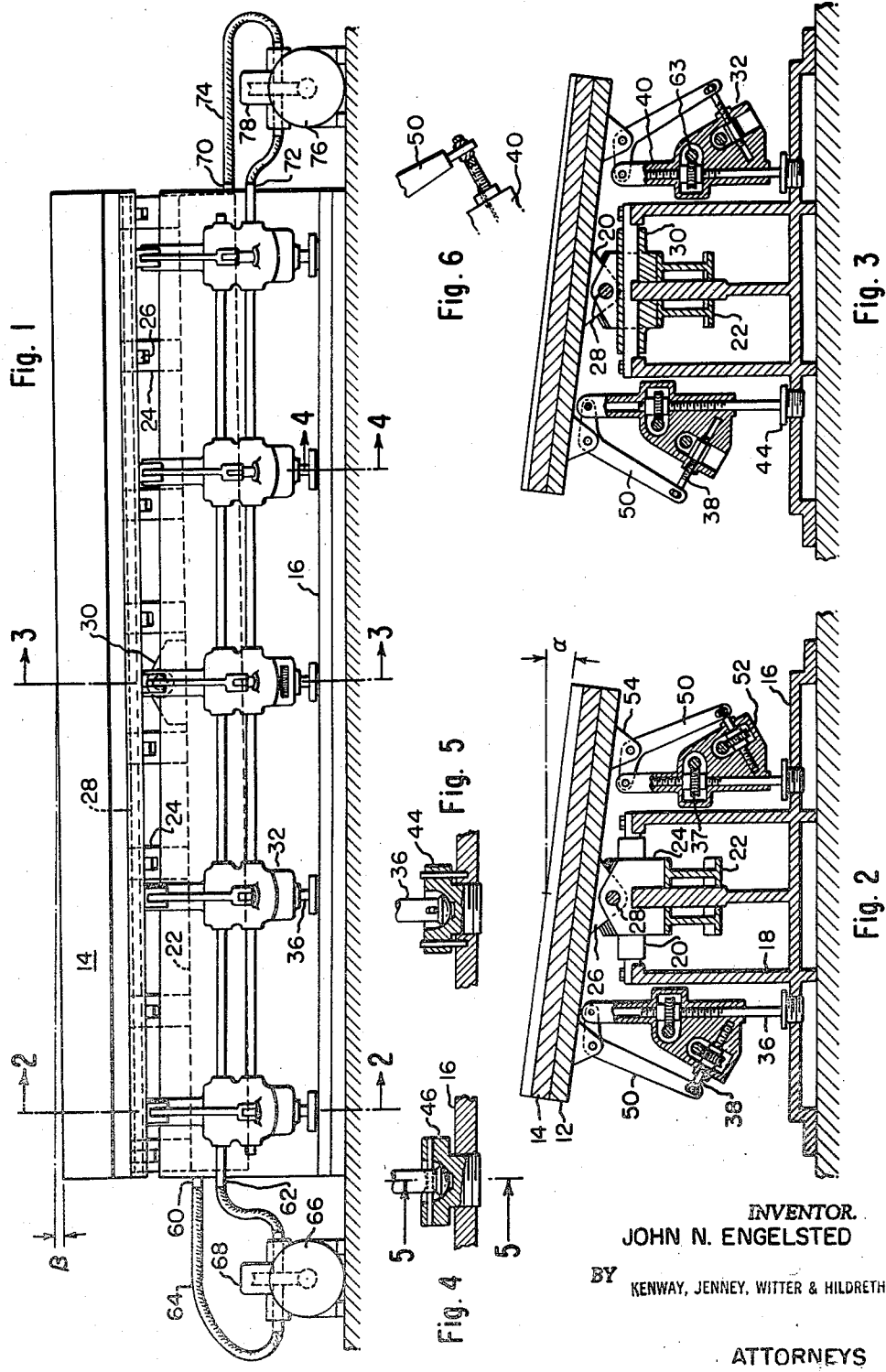

2,944,858

WORK SUPPORT HAVING INDEPENDENT TILT- ING ADJUSTMENTS ABOUT A PLURALITY OF AXES

John N. Engelsted, Petersham, Mass.
(% O. S. Walker Company Inc., Worcester, Mass.)

Filed Oct. 7, 1958, Ser. No. 765,800

14 Claims. (Cl. 311—38)

The present invention relates to work supports for machine tools and is concerned more particularly with work tables for supporting large and heavy work pieces for such operations as milling and grinding. The invention has a special utility in supporting relatively long objects which require distributed support in order that the dimensional tolerances may not be exceeded because of lack of structural rigidity of the work piece itself.

In the manufacture of such objects as airplane spars and wing sections, it has proven desirable to support such objects on a base or table large enough to provide support for substantially the entire length of the work piece. Not only must the work support be of sufficient rigidity to maintain the work piece in accurate relation to the machine tool over the entire surface of the work, but there must also be provision for tilting or swinging the work table in order to permit tapering the work piece in thickness both in longitudinal and in transverse directions.

While devices of this general type have heretofore existed, with provision for supporting the table about a central pivot and for tilting the table by means of adjusting devices at each end thereof or at the corners, it has been found difficult to meet the standards of accuracy that may be required. Even though the movable portion of the table may be of massive construction, nevertheless the longitudinal dimensions required to support long work pieces are such that the table can not be made sufficiently rigid within the permissible dimensions of table height. Furthermore, when the need is for both longitudinal and transverse tilting adjustment of the table, the complications of adjustment are such that it has been impractical to provide other than the minimum number of supports, generally at the four corners plus the central tilting support.

It is therefore an object of the present invention to provide a tiltable work table for milling machines and the like which may be fabricated in very large sizes yet is capable of accurate, non-sagging support of heavy work pieces while being adjustable both longitudinally and transversely to any desired angle within the normal requirements of such devices.

More specifically, it is an object of the invention to provide a tilting work table of large size and massive construction wherein a multiplicity of supporting points are provided, distributed throughout the length of the table, with the result that no large spans of the table are unsupported. In accordance with these objects, a feature of the invention consists in the provision of multiple supporting means for an adjustable work table wherein the adjustments at the several stations may be made quickly and with high accuracy so that at each station the table is properly supported, free of distortion either from improper adjustment or from sagging under its own weight or under the forces developed by the machining operation on the work piece.

More specifically, the invention has as a feature the provision of multiple table-supporting means having provision for dual independent adjustment, so that the longitudinal and transverse tilt angles may be introduced independently by separate calibrated mechanisms, one of which provides synchronized power adjustment of the longitudinal tilt while the other provides synchronized power adjustment of the transverse tilt.

In the drawings illustrating the invention according to a preferred embodiment thereof, Fig. 1 is a view in longitudinal side elevation of the adjustable work support.

Fig. 2 is a sectional elevation taken on the line 2—2 of Fig. 1.

Fig. 3 is a sectional elevation taken on the line 3—3 of Fig. 1.

Fig. 4 is a detailed sectional view taken on the line 4—4 of Fig. 1.

Fig. 5 is a detailed view of the part shown in Fig. 4, taken on the line 5—5 of said figure.

Fig. 6 is a detailed view showing an alternative embodiment of certain elements of the adjusting and supporting mechanism for table tilt.

The tiltable work support illustrated in the drawings comprises a long table 12, the top of which carries work-securing means 14 which may be a vacuum chuck or other means for supporting and securing the work against sliding along or across the table. By way of example, the table may have a length in excess of twenty feet. The table is mounted on a base frame 16, the configuration of the table and base being such as to permit utilization in place of the work support normally associated with the machine tool (not illustrated) such as a milling machine. The base is provided with longitudinally extending spaced vertical flanges or webs 18 which carry at their top and equidistant from their ends a cross shaft 20 about which the table tilts as a center to provide the longitudinal tilt. Such tilt is generally limited to a few degrees of arc since, in general, the length of the work piece is such that only a small amount of longitudinal tilt is needed to give the desired taper to a long work piece such as a wing or wing spar.

To permit the pivots for the table to be located a minimum distance beneath the table top, the longitudinal stiffening means for the table is arranged beneath the cross shaft 20 rather than above the same. Such stiffening means in the illustrative embodiment comprises a pair of H-beams or wide-flanged I-beams 22 in side by side relation. Disposed at spaced intervals along their length and bridging the tops of the beams are bearing blocks 24 while the underside of the work table has depending flanges 26 which are received between the upstanding sides of the bearing blocks. A longitudinal shaft 28 provides a pivotal connection between the bearing blocks and flanges.

The work table, transversely tiltable with respect to its longitudinal stiffening members, is supported for longitudinal tilting movement by means of a main bearing member 30 secured to the top of the H-beams and through which member extends the cross shaft 20. As a consequence, there results a rigid longitudinal structure, pivoted for limited rocking movement about cross shaft 20 and carrying the longitudinal shaft 28 about which the work table may be rocked for transverse tilt. Thus, a longitudinal backbone or strong back is provided for the table even though the stiffening members are disposed below the cross shaft 20 with the table itself tiltable relative to these members. Such construction enables the pivotal axes for the table tilts to have minimum vertical separation and to be close to the underside of the table rather than at a substantially lower position.

As has previously been indicated, a feature of the invention consists in the provision of multiple supporting and adjusting means, distributed at spaced intervals beneath the table so as to support the table accurately throughout its length and width for all combinations of longitudinal and transverse tilt within the range of movements for which clearance is available. To accomplish this support at a plurality of points while permitting accurate adjustment of both longitudinal and transverse or cross tilt, a multiplicity of adjusting jacks indicated generally at 32 are provided. These may be positioned at uniform intervals along the longitudinal edges of the table, a sufficient number being employed so that the span between supports is relatively short and therefore not subject to sagging or distortion under the work load or machine operation. These adjusting jacks are characterized by provision for positive mechanical adjustment of height, as distinguished from hydraulic devices which, though powerful, nevertheless lack the rigidity and the precision of adjustment (unless feedback is employed) of a screw-threaded jack arrangement.

The jacks 32 are constructed in such fashion as to permit their actuation by power driving means so that the table tilts may be set in by simple remote controls, as by push button operation of electric motors. A particular feature of the jacks involves the construction by which each jack has independent means for separate adjustments of the longitudinal and transverse tilts. As a consequence, independent power driving means are provided for the separate adjustments so that the longitudinal and transverse tilt angles may be accurately and quickly established by calibrated control means without mutual interaction and the resulting complications.

To accomplish this precise independent adjustment of the table tilt while affording rigid support of the table at each jack position, the jacks are provided with dual gear-driven screw-threaded adjusting means interconnected by means of a differential lever through which each jack is connected to the table. The jacks embody a transverse tilt adjusting screw 36 and a longitudinal tilt adjusting screw 38. A threaded sleeve cooperates with the screw 36 to raise and lower the jack body 40 when the gear 37 on sleeve 38 is rotated about its vertical axis. The lower end of threaded member 36 is provided with a ball end which is anchored for limited tilting movement in a socket 44 secured in the base 16. A transverse pin 46 prevents rotation of the rod 36 when the gear and threaded sleeve are being driven by the adjusting means to raise and lower the jack body 40. The upper end of the body is provided with a forked end to receive the end of the short arm of differential lever 50.

The longitudinal tilt which, as previously pointed out, is of relatively lesser angular magnitude than the transverse tilt, is provided by threaded screw 38 which slides in an oblique bore in body 40. Rotation of the threaded sleeve under the actuation of gear 52 moves the rod in or out of the body, the exposed end of the rod being pivotally connected by sliding transverse pin and slot connections to the oblique long arm of differential lever 50. Lever 50, relatively close to the upper end of the jack body 40, makes pivotal connection to depending flanges 54 on the underside of the table, as illustrated.

By the above described jack arrangement, wherein each jack body may be raised or lowered as a unit, the table may be given the desired transverse tilt about its longitudinal axis 28 through raising all the jacks on one side and lowering all the jacks along the other side. Such adjustment may readily be effected by means of shafts 60 and 62 which extend through each jack housing and have worm 63 which mesh with the gears 37 on the individual threaded sleeves. The shafts 60, 62 are rotated in the appropriate directions by means of flexible connections 64 from a reversible motor and reduction gear unit 66 which preferably has a counter 68 by which shaft rotation is correlated with degrees of transverse tilt of the table (angle $\alpha$ in Fig. 2). The motor advantageously may have the usual push button controls so that it may be rotated rapidly in either direction, and then moved incrementally at slow speed for accurate final adjustment.

The drives to adjust the jacks for longitudinal tilt are similarly arranged. Shafts 70, 72 extend through each jack body and are rotated by flexible shafts 74 from a reversible motor and speed reducer 76 having an indicator 78 to read in degrees of longitudinal tilt (angle $\beta$ in Fig. 1) as a function of shaft rotation. The worm and gear drives to the threaded sleeves on adjusting rods 38 and the directions of shaft rotation are such that one end of the table is raised while the other end is being lowered about the tilt axis 20. As in the case of the transverse tilt drive, the motor control may provide fast and slow speeds as well as reverse, for rapid coarse and precise final setting of the desired longitudinal tilt angle.

As has been indicated, a feature of the invention involves the construction and arrangement by which the longitudinal and transverse tilt adjustments are mutually independent, yet precise and capable of calibrated settings. It is apparent from the description so far that the transverse tilt is provided by bodily raising and lowering the jacks 32. The interconnected gear drives insure that all the jack bodies along one margin of the table move equal amounts in one direction, while the jacks along the other margin are moved the same corresponding distance in the other direction. As a result, uniform support is provided throughout the work table, whatever the transverse tilt angle may be, and likewise independent of the longitudinal tilt, over the tilt ranges customarily provided by work supports of this type.

This advantageous result is obtained by reason of the provision of the differential levers 50 and their actuation by the adjusting rods 38. When the transverse tilt drive is at rest, the jack bodies 32 are all stationary, whatever their settings. Upon actuation of the longitudinal tilt drive in one direction or the other, the gears 52 are rotated to move the rods in or out of the jack bodies, thereby causing levers 50 to rock about their pivots in the upper ends of the jack bodies and thereby raise or lower the corresponding portions of the table connected to the intermediate pivots on said levers. Thus, it is seen that the transverse tilt adjustment is obtained by bodily raising and lowering the jacks themselves, while the longitudinal tilt adjustment results from the supplementary or differential adjustment in which the table is raised or lowered relative to the individual jack bodies.

Because of the length of the work supporting table and the provision of supporting and adjusting at a plurality of points along the margins of the table, it is necessary to proportion the longitudinal tilt adjustments as a function of the distance of the jacks from the center of rotation (cross-shaft 20). This may readily be accomplished by providing different size gears in the drives for the various threaded rods 38 in the jack bodies. Since the table, for longitudinal tilt, rocks about shaft 20 as a center, the jacks located at this station are in the neutral zone and are not required to supply any differential action. Consequently, these jacks may omit any drive to the threaded sleeves on rods 38, the sleeves being initially adjusted to provide the desired contribution to the over-all support. Alternatively, the connection to the levers 50 at these jacks may be made by externally adjustable threaded studs and lock nuts, as shown in Fig. 6.

At the jacks intermediate the end and the center positions, the amount of movement provided by a given rotation of shafts 70 and 72 should be one-half that obtaining at the end jacks. Thus, viewing the front row of jacks in Fig. 1 and considering the longitudinal tilt angle as being to the left and therefore $-\beta$, the relative movements of the longitudinal tilt adjustments will be, for the jacks from left to right, as follows:

$$-\Delta H, -\Delta H/2, 0, +\Delta H/2, +\Delta H$$

and the same for the corresponding jacks in the back row.

The relative positions may be seen by comparing Figs. 2 and 3. In Fig. 2, showing the downward differential adjustment of the left hand jacks of Fig. 1, the screws 38 are fully retracted to lower the left end of the table. In Fig. 3, since the jacks are at the longitudinal center of the table, no longitudinal tilt adjustment is provided and the screws 38 remain in their pre-set intermediate position in which the short arms of differential levers 50 are maintained parallel to the horizontal. On the other hand, a view corresponding to Fig. 2 but taken at the right hand end of Fig. 1 would show the threaded rods 38 of the differential adjustment to be fully extended.

If, by way of example, the longitudinal tilt to the left (angle $-\beta$) is to be removed and the table moved to a position in which its longitudinal tilt angle is zero, then the drive motor 76 will be actuated until the counter reads zero degrees, at which time all the differential levers will, in general, have their short arms parallel to the base, the same as shown in Fig. 3, and such setting will be unaffected by whatever tilt angle is provided by the bodily adjustments of jack height.

Thus it is seen that the construction shown and described permits the work table to be tilted in either direction from the horizontal both transversely and longitudinally, yet by independent adjusting means which may readily be remotely controlled and calibrated in degrees of tilt. Furthermore, the adjustment is carried out in a manner which results, in all positions of the table, in accurately supporting the table at each jack so as to maintain the table rigid and plane in spite of heavy loads. Due to the irreversible nature of the driving means for the adjustments, no locking or clamping devices are required and as a practical matter the table angles may readily be changed while a machining operation is proceeding, as where the longitudinal taper angle of a wing or spar is to be varied over the length of the work.

While the invention has been described in terms of a particular embodiment, it will be understood that the invention is not so limited, as the features of multiple adjusting and supporting means with dual differential adjustments by which independent transverse and longitudinal tilt angles may be introduced through synchronized actuating means may be embodied in other forms and arrangements within the scope of the claims.

What is claimed is:

1. An adjustable work support for large work pieces, having a table supported for transverse and longitudinal tilting movements relative to a base about mutually perpendicular axes, a plurality of adjustable connections disposed at spaced intervals intermediate the table and the base for positioning the table about the tilt axes, said connections comprising jacks having primary adjusting means for effecting positive heightwise adjustment to tilt the table about one axis, and supplementary adjusting means in the connections between table and base carried by the jacks for effecting tilting movement of the table about the other tilt axis.

2. Apparatus according to claim 1 wherein the primary adjusting means are interconnected to a single drive means for effecting table tilt about one axis and wherein the supplementary adjusting means are interconnected to a second single drive means for effecting table tilt about the other tilt axis.

3. Apparatus according to claim 1 wherein the tilt adjustments about the mutually perpendicular axes are substantially independent of one another.

4. Apparatus according to claim 1 wherein the primary and supplementary adjusting means comprise screw-threaded jacks.

5. Apparatus according to claim 1 wherein the primary and supplementary adjusting means comprise screw-threaded jacks, the supplementary adjusting means being carried by and being bodily movable relative to the movable member of the primary adjusting means.

6. Apparatus according to claim 1 wherein the primary and supplementary adjusting means of the jacks are connected to the table by differential levers.

7. In an adjustable work support for large work pieces, having a table supported for transverse and longitudinal tilting movements relative to a base about mutually perpendicular axes close to the table, longitudinally disposed stiffening means extending substantially the length of the table adjacent the under side of the table, said stiffening means being pivotally supported on the base and the table being pivotally supported on the stiffening means.

8. Apparatus according to claim 7 wherein the pivotal supports for the table are disposed intermediate the table and the stiffening means.

9. Apparatus according to claim 7 wherein the transverse pivotal axis is intermediate the stiffening means and the table, and the longitudinal pivotad axis is intermediate the transverse axis and the table.

10. Apparatus according to claim 7 wherein the stiffening means is pivotally connected to the table at a plurality of spaced points along said means and table.

11. An adjustable work support for large work pieces, having a table supported for transverse and longitudinal tilting movements relative to a base about mutually perpendicular axes, a plurality of adjustable connections disposed at spaced intervals intermediate the table and the base for positioning the table about the tilt axes, said connections comprising jacks having bodies, primary adjusting screws anchored in the base, rotary screw-threaded means for raising and lowering the bodies on the primary adjusting screws, supplementary adjusting screws disposed for movement in the bodies along the axis of said screws, supplementary rotary screw-threaded means for advancing and retracting said supplementary adjusting screws, levers pivotally connecting the jack bodies and the supplementary adjusting screws, and connections between the table and the levers.

12. An adjustable work support for large work pieces, having a table supported for transverse and longitudinal tilting movements relative to a base about mutually perpendicular axes, a plurality of adjustable connections disposed at spaced intervals intermediate the table and the base for positioning the table about the tilt axes, said connections comprising jacks having bodies, primary adjusting screws anchored in the base, rotary screw-threaded means for raising and lowering the bodies on the primary adjusting screws, supplementary adjusting screws disposed for movement in the bodies along the axis of said screws, supplementary rotary screw-threaded means for advancing and retracting said supplementary adjusting screws, levers pivotally connecting the jack bodies and the supplementary adjusting screws, and connections between the table and the levers, the jacks along one tilt axis being substantially equally spaced on opposite sides of said axis and having their primary adjusting means interconnected by common driving means by which all jacks on one side move in one direction while all jacks on the other side move equal amounts in the opposite direction, said jacks being unequally spaced from the other tilt axis and having their supplementary adjusting means interconnected by second common driving means in which said supplementary adjusting means are moved by amounts proportional to the relative distances of said jacks from said other tilt axis.

13. An adjustable work support for large work pieces, having a table supported for transverse and longitudinal tilting movements relative to a base about mutually perpendicular axes, a plurality of adjustable connections disposed at spaced intervals intermediate the table and the base for positioning the table about the tilt axes, said connections comprising jacks having bodies, primary adjusting screws anchored in the base, rotary screw-threaded means for raising and lowering the bodies on the primary adjusting screws, supplementary adjusting screws disposed for movement in the bodies along the axis of said screws, supplementary rotary screw-threaded means for advancing and retracting said supplementary adjusting screws, levers pivotally connecting the jack bodies and the supplementary adjusting screws, and connections between the table and the levers the primary rotary adjusting means being interconnected by a pair of longitudinally extending shafts and the supplementary rotary adjusting means being interconnected by a second pair of longitudinally extending shafts, each pair of shafts having separate reversible driving means.

14. In an adjustable work support for large work pieces, having a table supported for transverse and longitudinal tilting movements relative to a base about mutually perpendicular axes close to the table, longitudinally disposed stiffening means extending substantially the length of the table adjacent the under side of the table, said stiffening means being pivotally supported on the base and the table being pivotally supported on the stiffening means, the stiffening means comprising at least a pair of spaced beam members disposed on the opposite side of the transverse axis from the table, a plurality of bearing blocks connecting said members, a plurality of bearing members projecting from the table into proximity to said bearing blocks, and pivotal means connecting the bearing blocks and bearing members.

References Cited in the file of this patent

UNITED STATES PATENTS

| | | |
|---|---|---|
| 2,172,941 | Manning et al. | Sept. 12, 1939 |
| 2,217,783 | Bell | Oct. 15, 1940 |
| 2,321,486 | Holt | June 8, 1943 |
| 2,343,993 | Naylor | Mar. 14, 1944 |
| 2,416,410 | Shampaine | Feb. 25, 1947 |
| 2,459,800 | Esgate | Jan. 25, 1949 |
| 2,686,095 | Carlson | Aug. 10, 1954 |
| 2,707,137 | Hollstein | Apr. 26, 1955 |
| 2,753,234 | Haag | July 3, 1956 |
| 2,774,642 | Waller | Dec. 18, 1956 |